United States Patent [19]

Sauerbier et al.

[11] Patent Number: 4,551,505

[45] Date of Patent: Nov. 5, 1985

[54] PROCESS FOR CROSSLINKING CHLORINATED POLYETHYLENE

[75] Inventors: Michael Sauerbier, Altrip; Helfried Ehrend, Speyer, both of Fed. Rep. of Germany

[73] Assignee: Rhein-Chemie Rheinau GmbH, Mannheim, Fed. Rep. of Germany

[21] Appl. No.: 654,228

[22] Filed: Sep. 25, 1984

[30] Foreign Application Priority Data

Oct. 8, 1983 [DE] Fed. Rep. of Germany ....... 3336753

[51] Int. Cl.$^4$ ............................ C08F 8/34; C08F 8/30
[52] U.S. Cl. ................... 525/346; 525/333.9; 525/331.4; 525/331.5; 525/334.1; 525/349; 525/381; 525/382; 525/379
[58] Field of Search .................. 525/346, 333.9, 331.4, 525/331.5, 334.1, 349, 381, 382, 379

[56] References Cited

U.S. PATENT DOCUMENTS

| | | | |
|---|---|---|---|
| 3,300,425 | 1/1967 | Nagelschmidt et al. | 525/331.5 X |
| 4,128,510 | 12/1978 | Richwine | 525/333.9 X |
| 4,288,576 | 9/1981 | Richwine | 525/333.9 X |
| 4,482,681 | 11/1984 | Berta et al. | 525/334.1 X |

FOREIGN PATENT DOCUMENTS

| | | | |
|---|---|---|---|
| 2312233 | 9/1973 | Fed. Rep. of Germany | 525/333.9 |
| 947581 | 1/1964 | United Kingdom | 525/346 |

*Primary Examiner*—Joseph L. Schofer
*Assistant Examiner*—S. Babajko
*Attorney, Agent, or Firm*—Connolly and Hutz

[57] ABSTRACT

The crosslinking of chlorinated polyethylene with 2,5-dimercapto-1,3,4-thiadiazole in the presence of a basic substance may be carried out easily and leads to improved vulcanizate properties if amido amines, for example tetraethylene pentamine distearate, are used as the basic substances.

1 Claim, No Drawings

PROCESS FOR CROSSLINKING CHLORINATED POLYETHYLENE

This invention relates to a process for crosslinking chlorinated polyethylene with 2,5-dimercapto-1,3,4-thiadiazole or 2,5-dimercapto-1,3,4-thiadiazole derivatives (DMTD), for example the monobenzoyl derivative, and certain amido amines.

It is known from DE-OS No. 2754060 and from DE-OS No. 2845125 that halogen-containing polymers can be crosslinked by heating in the presence of DMTD and a basic material. The basic material used is, in particular, a combination of an organic base and an inorganic base, an amine having a boiling point above about 110° C. and a pK-value below about 4.5 being suitable for use as the organic base. Dicyclohexylamine and a reaction product of aniline and butyraldehyde are mentioned as preferred amines.

As highly corrosive organic liquids, these amines are difficult to handle and equally difficult to incorporate in rubber mixtures. In addition, it has been found in the crosslinking of chlorinated polyethylene that the use of these amines results in unsatisfactory vulcanizate properties, in extensive mould fouling in the production of mouldings and in poor mould-release properties.

Accordingly, the object of the present invention is to provide more effective activators for the crosslinking of chlorinated polyethylene using DMTD.

According to the invention, this object is achieved by using amido amines corresponding to the following formula $$R-CO-NH-(CH_2-CH_2-NH)_n-R_1 \quad (I)$$

in which
R represents a saturated or unsaturated hydrocarbon radical containing from 6 to 22 carbon atoms,
$R_1$ represents alkyl, aryl, cycloalkyl, aralkyl or R—COCH$_2$CH$_2$ and
n is an integer of from 1 to 10, as activating basic material.

Accordingly, the present invention relates to a process for crosslinking chlorinated polyethylene in the presence of DMTD and a basic material, characterized in that the basic material is an amido amine corresponding to the following formula $$R-CO-NH-(CH_2-CH_2-NH)_n-R_1 \quad (I)$$

in which
R is a saturated or unsaturated hydrocarbon radical containing from 6 to 22 carbon atoms,
$R_1$ represents alkyl, aryl, cycloalkyl, aralkyl or R—COCH$_2$CH$_2$ and
n is an integer of from 1 to 10.

The alkyl radical may be linear or branched and, in particular, contains from 1 to 18 carbon atoms. The aryl radical preferably contains from 6 to 12 carbon atoms and may be substituted by halogen, $C_1$–$C_4$-alkyl, nitro, cyano or $C_1$–$C_4$-alkoxy groups; the cycloalkyl radical preferably contains from 5 to 8 carbon atoms; the aralkyl radical contains in particular from 7 to 12 carbon atoms and may be substituted in the aryl moiety in the same way as the above-mentioned aryl radical.

Preferred compounds correspond to the following formula $$R_2-CO-(NH-CH_2-CH_2)_m-NH-CO-R_3 \quad (II)$$

in which
$R_2$ and $R_3$ may be the same or different and represent straight-chain, saturated alkyl containing from 8 to 18 carbon atoms and
m is an integer of from 2 to 5.

The compounds corresponding to formulae I and II are generally solid, non-caustic substances which may readily be incorporated in rubber mixtures.

The amido amine is preferably used in a quantity of from 1 to 5% by weight and, more particularly, in a quantity of from 2 to 4.5% by weight, based on rubber. DMTD is preferably used in a quantity of from 1 to 4% by weight and, more particularly, in a quantity of from 2 to 3% by weight, based on rubber.

Detailed information on the properties and applications of chlorinated polyethylene, referred to ASTM-D 1418 as CM, can be found in E. Rohde, Kautschuk & Gummi, Kunststoffe 35, 1982, Pages 478 et seq.

CM is a chlorinated polyethylene containing from about 25 to 45% by weight of chlorine which is produced by the suspension chlorination of low-pressure polyethylene.

EXAMPLE 1

The Vulkameter test according to DIN 53 529 shows that the tetraethylene pentamine distearate according to the invention has a stronger activating effect than the condensation product of aniline and butyraldehyde and the ethylene diamine distearate used for comparison which does not contain any free amino groups. The following rubber mixture was tested:

TABLE 1

|  | a | b | c | d | e |
|---|---|---|---|---|---|
| Chlorinated polyethylene | 100 | 100 | 100 | 100 | 100 |
| MgO | 10 | 10 | 10 | 10 | 10 |
| Carbon black | 40 | 40 | 40 | 40 | 40 |
| Clay | 80 | 80 | 80 | 80 | 80 |
| Aromatic mineral oil | 40 | 40 | 40 | 40 | 40 |
| DMTD | 2.5 | 2.5 | 2.5 | 2.5 | 2.5 |
| Aniline/butyraldehyde condensate | 1.5 | 3.0 | — | — | — |
| Ethylene diamine distearate | — | — | 3.0 | — | — |
| Tetraethylene pentamine distearate | — | — | — | 3.0 | — |
| Vulkameter test according to DIN 53529 |  |  |  |  |  |
| $t_5/180°$ C. (mins.) | 2.6 | 2.5 | 8.7 | 2.2 | 12.0 |
| $t_{50}/180°$ C. (mins.) | >12.0 | 7.5 | n.m. | 4.8 | n.m. |
| $F_5/180°$ C. (dN · m) | 46.5 | 65.8 | 23.7 | 77.3 | 31.0 |

*n.m. = non-measurable

EXAMPLE 2

This Example shows that higher degrees of crosslinking and distinctly more favorable physico-technological properties of the vulcanizates are obtained with the amido amine derivatives according to the invention. In addition, it was found that mouldings produced with the amido amines according to the invention showed better mould release and less mould fouling than mouldings which had been produced with the known amines. The activators according to the invention provide for extremely rapid vulcanization, higher tensile strengths and lower compression set values being obtained. In addition, ageing behavior as reflected in the slight reduction in breaking elongation after storage in hot air (7 days/125° C.) is positively influenced.

TABLE 2

|  | a | b | c | d |
|---|---|---|---|---|
| Chlorinated polyethylene | 100 | 100 | 100 | 100 |
| MgO | 10 | 10 | 10 | 10 |
| Carbon black | 40 | 40 | 40 | 40 |
| Clay | 80 | 80 | 80 | 80 |
| Aromatic mineral oil | 40 | 40 | 40 | 40 |
| DMTD | 2.5 | 2.5 | 2.5 | 2.5 |
| Dicyclohexylamine | 1.5 | — | — | — |
| Aniline/butyraldehyde condensate | — | 1.5 | — | — |
| Pentaethylene hexamine distearate | — | — | 3 | — |
| Tetraethylene pentamine distearate | — | — | — | 3 |
| Vulkameter test according to DIN 53529: | | | | |
| $t_5/180°$ C. (mins.) | 1.9 | 3.0 | 1.7 | 1.9 |
| $F_5/180°$ C. (dN · m) | 78 | 34 | 81 | 72 |
| Stored for 4 weeks at RT: | | | | |
| $t_5/180°$ C. (mins.) | 1.4 | 2.0 | 1.5 | 1.6 |
| $F_5/180°$ C. (dN · m) | 66 | 46 | 87 | 81 |
| Vulcanization (20 mins./160° C.): | | | | |
| Hardness (Shore A) | 75 | 78 | 72 | 70 |
| Tensile strength (MPa) | 12.3 | 8.5 | 13.4 | 13.5 |
| Elongation at break (%) | 540 | 510 | 560 | 570 |
| Compression set: 70 h/100° C. (%) | 44 | 73 | 39 | 36 |
| Ageing in hot air (7 d/125° C.): | | | | |
| Δ Tensile strength (%) | 16 | 35 | 18 | 16 |
| Δ Elongation at break (%) | 50 | 65 | 36 | 37 |

EXAMPLE 3

This Example demonstrates the range of variation of the activator substances according to the invention in the crosslinking of chlorinated polyethylene. Depending on the degree of safety required for processing, the dosage amounts to between 2 and 4.5% by weight, based on rubber, for a DMTD dosage of 2.5% by weight, again based on rubber.

TABLE 3

|  | a | b | c | d | e |
|---|---|---|---|---|---|
| Chlorinated polyethylene | 100 | 100 | 100 | 100 | 100 |
| MgO | 10 | 10 | 10 | 10 | 10 |
| Carbon black | 40 | 40 | 40 | 40 | 40 |
| Clay | 80 | 80 | 80 | 80 | 80 |
| Aromatic mineral oil | 40 | 40 | 40 | 40 | 40 |
| DMTD | 2.5 | 2.5 | 2.5 | 2.5 | 2.5 |
| Tetraethylene pentamine distearate | 1.5 | 2.25 | 3.0 | 3.75 | 4.5 |
| Vulkameter test according to DIN 53529: | | | | | |
| $t_5/180°$ C. (mins.) | 4.0 | 2.6 | 2.5 | 1.4 | 1.0 |
| $F_5/180°$ C. (dN · m) | 25.0 | 45.5 | 49.5 | 88.5 | 92.5 |
| Vulcanization (20 mins/160° C.): | | | | | |
| Hardness (Shore A) | 71 | 73 | 72 | 72 | 70 |
| Tensile strength (MPa) | 9.1 | 12.5 | 11.9 | 13.2 | 13.0 |
| Elongation at break (%) | 640 | 610 | 600 | 520 | 510 |
| Compression set: 70 h/100° C. | 94 | 64 | 66 | 44 | 48 |
| Ageing in hot air (7 d/125° C.): | | | | | |
| Δ Tensile strength (%) | 8 | 13 | 10 | 11 | 6 |
| Δ Elongation at break (%) | 39 | 38 | 35 | 21 | 24 |

We claim:

1. In the process for crosslinking chlorinated polyethylene in the presence of 2,5-dimercapto-1,3,4-thiadiazole or a DMTD derivative and a basic material, the improvement comprises the basic material being an amido amine corresponding to the formula $$R_2-CO-(NH-CH_2-CH_2)_m-NH-CO-R_3$$

in which
  $R_2$ and $R_3$ are the same or different and represent a straightchain, saturated alkyl radical containing from 8 to 18 carbon atoms and
  m is an integer of from 2 to 5.

* * * * *